United States Patent Office 3,485,833
Patented Dec. 23, 1969

3,485,833
N-SUBSTITUTED ISOCYANURATES
Alexander Sadle, 22 Mountainside Drive,
Morristown, N.J. 07960
No Drawing. Continuation of application Ser. No.
686,741, Nov. 29, 1967. This application Mar. 5,
1969, Ser. No. 804,680
Int. Cl. C07d 55/38
U.S. Cl. 260—248         1 Claim

ABSTRACT OF THE DISCLOSURE

Novel tri-($\beta$-carboxyethyl)isocyanurates are obtained by reacting cyanuric acid with a molar excess of acrylonitrile to form tri-($\beta$-cyanoethyl)-isocyanurate which is then converted to the corresponding tri-($\beta$-carboxyethyl)-isocyanurate. These compounds are useful in the manufacture of polyester resins.

---

This application is a continuation of my copending application Ser. No. 686,741, filed Nov. 29, 1967, now abandoned, which is a continuation of my application Ser. No. 370,347, filed May 26, 1964, now abandoned, which is a division of my application Ser. No. 814,671, filed May 21, 1959, now U.S. Patent 3,235,553.

The novel compounds of my invention may be represented by the general formula:

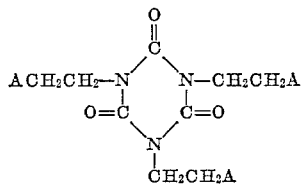

wherein A is a member selected from the group consisting of the —COOH radical and —COOR radicals wherein R represents a lower alkyl group.

I have discovered that the N-substituted isocyanurates of the present invention can be obtained by reacting cyanuric acid with a molar excess of acrylonitrile in the presence of a strongly alkaline catalyst and in a reaction medium containing a suitable solvent for the reactants and the $\beta$-cyanoethyl isocyanurate intermediate product which is formed. Such a solvent is stable and unreactive under the process conditions. The $\beta$-cyanoethyl product may then be reacted in a conventional manner to obtain the $\beta$-carboxyethyl isocyanurate and corresponding lower alkyl esters thereof.

Depending upon the amount of acrylonitrile employed, the resulting product is mainly di($\beta$-cyanoethyl)-isocyanurate or tri($\beta$-cyanoethyl)-isocyanurate. The relative yields of di($\beta$-cyanoethyl)-isocyanurate and tri($\beta$-cyanoethyl)-isocyanurate obtained can be controlled by varying the proportion of acrylonitrile to cyanuric acid employed and the duration of the reaction. With amounts of acrylonitrile in excess of 3 mols per mol of cyanuric acid, the yield of tri($\beta$-cyanoethyl)-isocyanurate is much greater than that of di($\beta$-cyanoethyl)-isocyanurate, and especially when the reaction mixture is maintained at reaction temperature for a sufficient time to permit the cyanoethylation to go the completion. The tri($\beta$-cyanoethyl)-isocyanurate obtained can then be hydrolyzed to the corresponding tri($\beta$-carboxyethyl)-isocyanurate, either in the free acid or salt form, by heating the tri($\beta$-cyanoethyl)-isocyanurate with aqueous alkali. This product can then be reacted with a lower alcohol in a conventional manner to obtain the lower alkyl esters of the tri($\beta$-carboxyethyl)-isocyanurate.

When the hydrolysis is carried out by means of a mineral acid, the tri($\beta$-carboxyethyl)-isocyanurates are obtained in the form of the free acids. When the hydrolysis is carried out by means of alkali, the tri($\beta$-carboxyethyl)-isocyanurates are obtained in the form of the corresponding salts, from which the free acids also can be obtained by acidification. Accordingly, as employed herein, the term "carboxyethyl" denotes and includes the free acid and salts forms thereof; namely, the radical —CH$_2$CH$_2$COOM wherein M represents hydrogen, a metal or an organic cation.

The N-substituted isocyanurates in which the N-substituents are $\beta$-substituted ethyl radicals having the above formula are useful as intermediates for the manufacture of other chemical compositions, and especially as starting materials for the manufacture of synthetic resins of the polyester, polyamide and polyurethane types.

The tri($\beta$carboxyethyl)-isocyanurate and its lower alkyl esters are useful for the manufacture of synthetic resins. Thus, the tri($\beta$-carboxyethyl)-isocyanurate is useful in the preparation of polyesters by reaction with polyhydric alcohols or polyamines and these reaction products may be further reacted with isocyanates to produce polyurethane products useful in the production of foamed articles, particularly rigid foams suitable for thermal and structural insulation. The polyesters themselves are useful in the preparation of fibers and as coating resins. The octyl esters are suitable as plasticizers for resin coatings. The lower alkyl esters of the tri($\beta$-carboxyethyl)-isocyanurates are particularly useful for the preparation of polyester resins; for example, by reaction with ethylene glycol, hexamethylene glycol, or butanediol, etc.

In carrying out the preparation of the tri($\beta$-cyanoethyl)-isocyanurate in accordance with the present invention, acrylonitrile is added to a solution of cyanuric acid in a solvent for the tri($\beta$-cyanoethyl)-isocyanurate containing a small amount of a strongly alkaline material which functions as a catalyst. The acrylonitrile is preferably added in small portions with stirring of the mixture so as to avoid polymerization of the acrylonitrile and the resulting mixture is then heated to the boiling temperature, with refluxing of the vapors, to complete the cyanoethylation. Upon cooling, tri($\beta$-cyanoethyl)-isocyanurate precipitates as a white crystalline material, which is separated from the remaining mother liquor. It can be purified by recrystallization from a solvent.

Depending upon the proportion of acrylonitrile employed with respect to cyanuric acid, mono, di or tri($\beta$-cyanoethyl)-isocyanurates, or mixtures thereof, are obtained. Since the more highly cyanoethylated isocyanurates are less soluble than the less highly cyanoethylated compounds, they can be separated by fractional crystallization from a solvent.

Preferred solvents employed in the practice of the present invention are dimethylformamide and 1-methyl-2-pyrrolidone, since they are excellent solvents for tri($\beta$-cyanoethyl)-isocyanurate at elevated temperatures but dissolve only small amounts thereof at ordinary room temperature, and since they dissolve the reactants and the initial reaction products, are inert to acrylonitrile, and are stable under process conditions.

Various strongly alkaline materials may be used as catalyst. Preferably strongly basic organic cationic compounds, and especially quaternary organic ammonium bases, such as trimethylbenzylammonium hydroxide, tetramethylammonium hydroxide, tetraethylammonium hydroxide and N-dimethylpiperidinium-ammonium hydroxide, are employed as catalysts since they are readily soluble in the organic solvents employed as reaction media. Only small amounts of the catalysts are required to effect the cyanoethylation; usually an amount of catalyst equal to 1% to 5% of the weight of the acrylonitrile employed is sufficient.

The tri(β-cyanoethyl)-isocyanurate can be hydrolyzed to the corresponding tri(β-carboxyethyl)-isocyanurate, in accordance with the present invention, by heating them to boiling with aqueous mineral acid, such as hydrochloric acid, hydrobromic acid, sulfuric acid, phosphoric acid and nitric acid.

Hydrolysis with formation of the tri(β-carboxyethyl)-isocyanurate in the form of the alkali metal salts can be effected in accordance with the present invention by heating the tri(β-cyanoethyl)-isocyanurate with dilute sodium hydroxide or other alkali metal hydroxide aqueous solutions.

The invention will be illustrated by the following specific examples, but it is to be understood that it is not limited to the details thereof and that changes may be made without departing from the scope of the invention. The temperatures are in degrees centigrade and the parts and percentages are by weight, unless designated as parts by volume. Where parts are by volume, the amount signifies the volume occupied by the same number of parts by weight of water at 4° C. Temperatures are given in centigrade.

EXAMPLE 1

Cyanuric acid (129 parts=1 mol) was added with stirring to a solution of 36 parts by volume of a 38% aqueous solution of trimethylbenzylammonium hydroxide in 750 parts by volume of dimethylformamide contained in a closed reaction vessel provided with a stirrer, a reflux condenser, and heating and cooling means. To the resulting mixture, acrylonitrile was added at room temperature over a period of one hour in an amount totaling 159 parts (3 mols) while continuing the stirring. The resulting mixture was heated to boiling (120°–130°) over the course of one hour and maintained at said temperature, with refluxing for an additional hour and one-half. The resulting clear solution was cooled to room temperature, and the white precipitate which formed was separated by filtration and dried. The yield was 95.4 parts of a product melting at 220°–230°. The product was purified by recrystallization from dimethylformamide. The purified product melted at 228°–230°.

Analysis of a sample of the purified material gave the following results:

Calculated for tri(β - cyanoethyl) - isocyanurate: C, 50.00%; H, 4.17%; N, 29.18%. Found: C, 50.01%; H, 4.26%; N, 29.10%.

Infrared spectrum analysis of the product indicated the structure of the cyanurate radical to be the iso form. Thus, the product of this example was tri(β-cyanoethyl)-isocyanurate, corresponding to the formula:

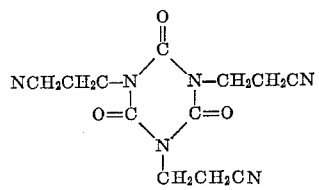

EXAMPLE 2

The procedure of Example 1 was repeated, with the exception of the use of a total of 186 parts (3.5 mols), instead of 159 parts, of acrylonitrile. As a consequence, the yield of crude tri(β-cyanoethyl)-isocyanurate was increased to 157 parts.

EXAMPLE 3

Fifteen parts of tri(β-cyanoethyl)-isocyanurate, prepared in accordance with Example 1 above, were mixed with 150 parts by volume of 28% aqueous hydrochloric acid and the mixture was heated to boiling, with reflux of the vapors, for 4 hours. Upon cooling to room temperature, filtering off the solids and drying, 17.9 parts of a white solid melting at 226°–230° were obtained. Recrystallization from water gave a purified product melting at 228°–229°.

Analysis of a sample of the purified material gave the following results:

Calculated for tri(β-carboxyethyl)-isocyanurate: C, 41.75%; H, 4.35%; N, 12.17%. Found: 41.87%; H, 4.26%; N, 29.10%.

The neutral equivalent of the product was 114.8 as compared to a theoretical value of 115. Infrared spectrum analysis of the product indicated the structure of the cyanurate radical to be the iso form. Thus, the product of the example was tri(β-carboxyethyl)-isocyanurate, corresponding to the formula:

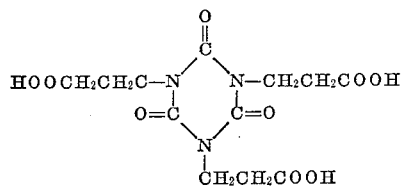

EXAMPLE 4

A solution of 34.5 parts of tri(β-carboxyethyl)-isocyanurate, prepared in accordance with the procedure of Example 3 above, was mixed with 200 parts by volume of a 5-normal solution of hydrogen chloride in ethanol and the resulting mixture was heated for 2 hours at the boiling temperature (about 78° C.) with reflux of the vapors. Upon cooling to room temperature, filtering off the solids and drying, 40 parts of a white solid were obtained, which after purification by recrystallization from ethanol melted at 50°–52°.

Analysis of a sample of the purified material gave the following results:

Calculated for triethyl ester of tri(β-carboxyethyl)-isocyanurate: C, 50.35%; H, 6.33%; N, 9.78%. Found: C, 50.16%; H, 6.33%; N, 9.78%.

EXAMPLE 5

Tri(beta-carbethoxyethyl)-isocyanurate, 1 mol, and hexamethylene glycol, 9 mols, were mixed and heated in the presence of 0.1% by weight of $Sb_2O_3$ at 180–200° C. at atmospheric pressure for seven hours. During the ester interchange which took place, 77% of the theoretical amount of ethanol was recovered indicating production of the hexamethylene glycol polyester to at least about this extent. Next, 72.8% of the excess hexamethylene glycol was removed at 141° C./0.22 mm. Hg.

Fifty parts of the hexamethyleneglycol polyester thus produced was mixed with 17 parts of toluene diisocyanurates and stirred. To this was added a solution containing 1 part of N-methylmorpholine (catalyst), 2 parts water, and 1 part of detergent. Foaming was almost instantaneous. The foam was heated in an oven for 45 minutes at 105° C. to complete the cure.

The finished foam was white, rigid and resistant to mechanical shock.

It will be evident that the invention is not limited to the details of the foregoing illustrative examples and that changes can be made without departing from the scope of the invention.

Thus, in preparing the β-cyanoethyl isocyanurates, salts of cyanuric acid may be substituted for cyanuric acid. For example, trimethylbenzylammonium cyanurate may be used. If desired, alkyl acrylonitriles may be substituted for acrylonitrile.

Corresponding esters of other lower alcohols may be prepared by replacing the ethanol employed in Example 4 by an equivalent amount of another lower alcohol. By limiting the amount of ethanol or other lower alcohol employed, partial esters of said carboxyethyl isocyanurates may be prepared.

I claim:
1. Tri-N-(β-carboxyethyl)-isocyanurate.

References Cited

FOREIGN PATENTS 812,312   8/1951   Germany.

OTHER REFERENCES

Adams et al., J. Am. Chem. Soc., vol. 69, pp. 1803–5 (1947).

Reppe et al., Annalen der Chemie, vol. 596, pp. 167 and 190 (1955).

HENRY R. JILES, Primary Examiner

J. M. FORD, Assistant Examiner

U.S. Cl. X.R.

260—75